United States Patent
Belharouak et al.

(10) Patent No.: US 12,327,847 B2
(45) Date of Patent: Jun. 10, 2025

(54) METHOD OF RECYCLING MATERIALS FROM LITHIUM-ION BATTERIES

(71) Applicant: UT-Battelle, LLC, Oak Ridge, TN (US)

(72) Inventors: Ilias Belharouak, Oak Ridge, TN (US); Yaocai Bai, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 636 days.

(21) Appl. No.: 17/706,981

(22) Filed: Mar. 29, 2022

(65) Prior Publication Data

US 2022/0344737 A1     Oct. 27, 2022

Related U.S. Application Data

(60) Provisional application No. 63/178,569, filed on Apr. 23, 2021.

(51) Int. Cl.
*H01M 10/54* (2006.01)
(52) U.S. Cl.
CPC ............................ *H01M 10/54* (2013.01)
(58) Field of Classification Search
CPC ................................................ H01M 10/54
See application file for complete search history.

(56) References Cited

U.S. PATENT DOCUMENTS

| | | | |
|---|---|---|---|
| 2019/0089025 A1* | 3/2019 | Ho | H01M 10/54 |
| 2023/0055166 A1* | 2/2023 | Aldous | H01M 10/54 |

OTHER PUBLICATIONS

Kai He, Zhi-Yuan Zhang, Lagu Alai, Fu-shen Zhang, A green process for exfoliating electrode materials nd simultaneously extracting electrolyte from spent lithium-ion batteries, Aug. 5, 2019, vol. 375, pp. 43-51. (Year: 2019).*

He, K. et al., "A green process for exfoliating electrode materials and simultaneously extracting electrolyte from spent lithium-ion batteries", Journal of Hazardous Materials 375 (2019) 43-51.

* cited by examiner

*Primary Examiner* — Basia A Ridley
*Assistant Examiner* — Julia Marie Fehr
(74) *Attorney, Agent, or Firm* — WARNER NORCROSS + JUDD LLP

(57) ABSTRACT

A method of recycling lithium-ion battery materials is provided. The method includes isolating a composite electrode that includes an electrode material adhered to a current collector. The composite electrode is combined with an aqueous buffer solution to form a mixture. The electrode material is delaminated from the current collector in the mixture to give a free electrode material and a free current collector. Each of the free electrode material and the free current collector is recovered from the mixture. Combining the composite electrode with the aqueous buffer solution occurs before delaminating the electrode material from the current collector. The step of delaminating optionally may include adding a surfactant to the mixture.

18 Claims, 3 Drawing Sheets

METHOD OF RECYCLING MATERIALS FROM LITHIUM-ION BATTERIES

CROSS-REFERENCE TO RELATED APPLICATIONS

This application claims the benefit of U.S. Provisional Application 63/178,569, filed Apr. 23, 2021, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present disclosure relates generally to battery recycling and, more specifically, to a method of recycling spent lithium-ion batteries by recovering reusable components therefrom.

BACKGROUND OF THE INVENTION

Since their commercialization in the early 1990s, lithium-ion batteries have been widely used to power consumer electronics. Meanwhile, they are gaining increasing popularity in electric vehicles (e.g. electric vehicles (EVs), hybrid vehicles (HVs), plug-in hybrid vehicles (PHVs), etc.) owing to their high energy density and long cycle life. However, in addition to growing adoption and development of lithium-ion battery-powered technologies, there is an increasing concern of flooding the market with end-of-life batteries. Specifically, estimates project that over 11 million metric tons of lithium-ion batteries will approach end-of-life in the decade between 2020-2030. Unfortunately, the vast majority of such end-of-life lithium-ion batteries have historically ended up in landfills, increasing potential risks of contamination to local soil and groundwater and removing useful materials from many electronic supply chains. Despite these mounting concerns, there is still a severe lack of incentive to recycle spent lithium-ion batteries, with estimates indicating that fewer than 5% of all lithium-ion batteries are being recycled at present.

In a typical recycling process, spent battery cells are discharged and shredded, followed by electrolyte recovery and component separation to remove/reclaim components including plastics, pouch material, and steel casing. As a result, a feedstock of anode and cathode on their current collectors is generated. This feedstock contains the most valuable components in a lithium-ion cell, including black mass (e.g. active cathode materials and graphite), Cu foils, and Al foils. To reclaim active cathode materials with high purity for direct regeneration, separation of electrode materials and their current collector as well as of anodes and cathodes is required. There are several methods for separating electrode materials from metal foils, including solvent-based electrode recovery and thermal binder removal. However, these processes may require the use of toxic solvents and high amounts of energy, while also resulting in low peeling-off efficiency. In addition, there are some methods for separating anodes and cathodes, including density separation, froth flotation, and magnetic separation. However, current techniques require a complex set of separation processes to produce clean streams of material, resulting in lower recovery rates and higher costs. It is thus extremely important to develop a simple, energy-efficient, scalable, and cost-effective separation process to efficiently recover high-purity cathode materials as well as other battery materials so that different concentrated feedstocks are provided for further direct regeneration and recovery processes.

SUMMARY OF THE INVENTION

A method of recycling lithium-ion batteries is provided. The method is useful for recovering re-usable components, in particular components of composite electrodes, from spent lithium-ion batteries, as well as recovering components from composite electrode scraps obtained during production of composite electrodes. The method provides a highly efficient, cost-effective, and environmentally sustainable separation process that enables direct recycling of lithium-ion battery materials without using toxic, expensive, and/or volatile solvents. The method is a "one-pot" water-based separation process to separate both anode/cathode and electrode/current collectors to recover cathode films, Al foils, anode films, and Cu foils. By circumventing a complex set of separation processes, the aqueous separation method can fulfill the goal of reclaiming higher-purity materials, making the recycling more profitable. Further, the aqueous solution does not damage the active cathode materials nor corrode the metal foils. In addition, the process may provide for room temperature separation in a low-priced water solution, reducing energy consumption and processing costs.

The method includes isolating a composite electrode that includes an electrode material adhered to a current collector. The method further includes combining the composite electrode with an aqueous buffer solution to form a mixture. The method further includes delaminating the electrode material from the current collector in the mixture to give a free electrode material and a free current collector. The method also includes recovering each of the free electrode material and the free current collector from the mixture. In the method, the step of combining the composite electrode with the aqueous buffer solution occurs before the step of delaminating the electrode material from the current collector.

In some embodiments, the composite electrode may be further defined as a composite anode, the electrode material may be further defined as an anode active material, and (i) the anode active material comprises an electroconductive carbon compound, (ii) the current collector comprises copper, or (iii) both (i) and (ii). In other embodiments, the composite electrode may be further defined as a composite cathode, the electrode material may be further defined as a cathode active material, and (i) the cathode active material comprises a lithium-bearing metal oxide, (ii) the current collector comprises aluminum, or (iii) both (i) and (ii).

In some embodiments, the step of delaminating may be conducted at room temperature.

In some embodiments, the aqueous buffer solution may maintain a pH of between 4 and 7, and the aqueous buffer solution may be one of a phosphate buffer solution, an acetate buffer solution, a citrate buffer solution, or similar buffer solution.

In some embodiments, the step of delaminating may include adding a surfactant to the mixture. The surfactant may be one or more selected from the group consisting of sodium dodecyl sulfate (SDS), sodium lauryl sulfate (SLS), poly(acrylic acid) (PAA), poly(ethylene glycol) (PEG), and polyethylene glycol tert-octylphenyl ether. The step of delaminating may be conducted at a temperature of between 20 and 100° C.

In some embodiments, the step of delaminating may include stirring the mixture.

In some embodiments, the step of delaminating may be complete in under 30 minutes.

In some embodiments, the step of recovering each of the free electrode material and the free current collector from the mixture may include one or more of (i) sieving the mixture, (ii) subjecting the mixture to filtration, (iii) milling the free electrode material and the free current collector, (iv) rinsing at least one of the free electrode material and the free current collector, and (v) drying at least one of the free electrode material and the free current collector.

In some embodiments, the composite electrode may be further defined as both a composite anode and a composite cathode, the composite anode comprising an anode active material adhered to an anode current collector, and the composite cathode comprising a cathode active material adhered to a cathode current collector. The step of combining may include mixing the composite anode and the composite cathode in the aqueous buffer solution to form a first mixture. The step of delaminating may include separating the anode active material from the anode current collector to form a second mixture comprising free anode active material, free anode current collector, and the composite cathode. The step of recovering may include removing the free anode active material from the second mixture. Subsequent to removing the free anode active material from the second mixture, the step of combining may further include mixing the free anode current collector and the composite cathode in the aqueous buffer solution to form a third mixture. The step of delaminating may further include adding a surfactant to the third mixture to form a fourth mixture. The step of delaminating may further include separating the cathode active material from the cathode current collector in the fourth mixture to form a fifth mixture comprising free cathode active material, free cathode current collector, and the free anode current collector. The step of recovering may further include removing the free cathode active material, the free cathode current collector, and the free anode current collector from the fifth mixture. The composite anode and the composite cathode are delaminated sequentially in that order.

In some embodiments, the step of removing the free anode active material from the second mixture may include reducing the size of anode active material through stirring or Vortex shaking, filtering the second mixture, and washing and drying the free anode active material. The step of removing the free cathode active material, the free cathode current collector, and the free anode current collector from the fifth mixture may include: filtering the fifth mixture; washing and drying the free cathode active material, the free cathode current collector, and the free anode current collector; and milling and sieving the free cathode active material, the free cathode current collector, and the free anode current collector.

In some embodiments, the step of filtering the second mixture may include screen filtering the second mixture to separate the free anode current collector and composite cathode from the second mixture, rinsing the free anode current collector and composite cathode to remove any residual free anode active material, and subsequently filtering a remaining mixture of free anode active material in the aqueous buffer solution and to obtain the free anode active material.

In some embodiments, the step of isolating the composite electrode may include (i) separating the composite electrode from one or more other components of the lithium-ion battery, (ii) washing the composite electrode to remove a residual electrolyte therefrom, or (iii) both (i) and (ii).

In some embodiments, the method may further include the step of shredding the isolated composite electrode into a collection of smaller fragments before the step of combining the composite electrode with the aqueous buffer solution to form the mixture.

In some embodiments, the composite electrode may be one or both of a spent electrode from a spent lithium-ion battery and electrode scrap from an electrode manufacturing process.

In some embodiments, the electrode material may be adhered to the current collector with one of a polyvinylidene difluoride (PVDF) binder, a styrene-butadiene rubber (SBR) binder, a carboxymethyl cellulose (CMC) binder, a poly (acrylic acid) (PAA) binder, or other suitable binder.

In some embodiments, the free electrode material recovered from the mixture may (i) comprise substantially the same morphology as the electrode material, (ii) comprise substantially the same chemical composition as the electrode material; (iii) comprise substantially the same electrochemical performance as the electrode material; or (iv) any combination of (i)-(iii). The free current collector recovered from the mixture may be substantially free from (i) corrosion, (ii) residual electrode material, or (iii) both (i) and (ii).

These and other features of the invention will be more fully understood and appreciated by reference to the description of the embodiments, when viewed in accordance with the accompanying examples and the appended claims.

DETAILED DESCRIPTION OF THE CURRENT EMBODIMENTS

Figure 1:
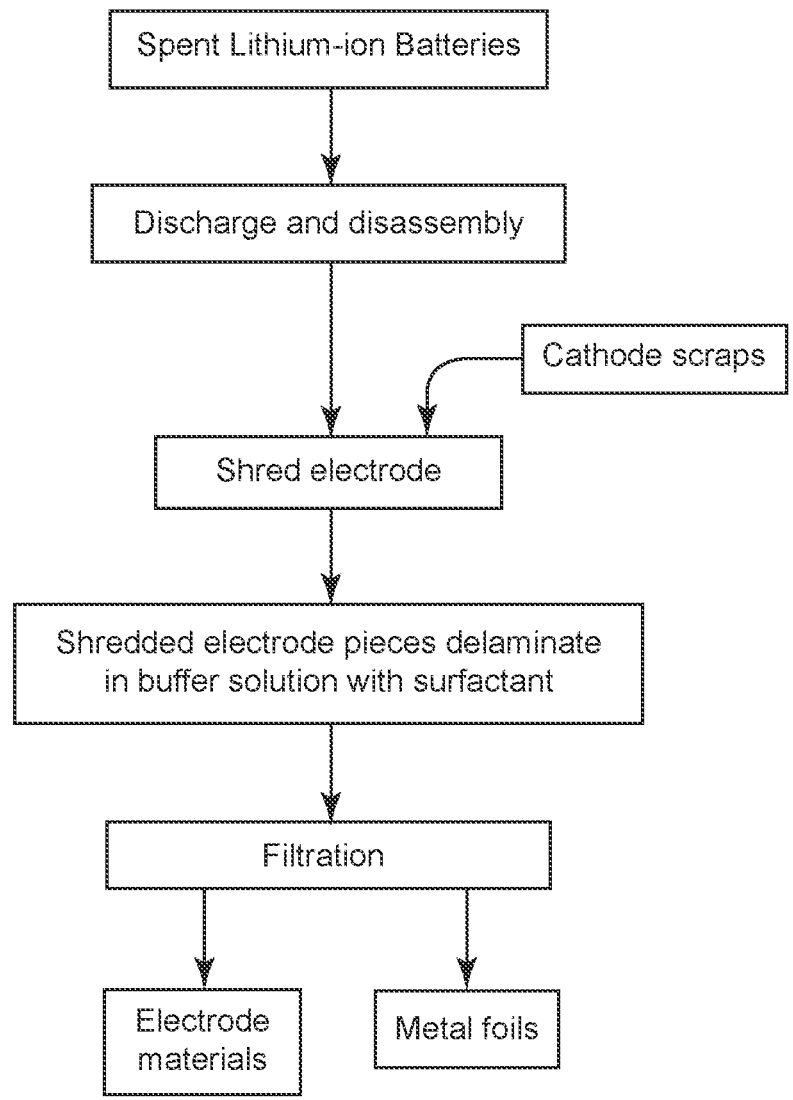
FIG. 1 is a flow chart illustrating a method of recycling lithium-ion battery materials in accordance with some embodiments of the disclosure.
Figure 2:
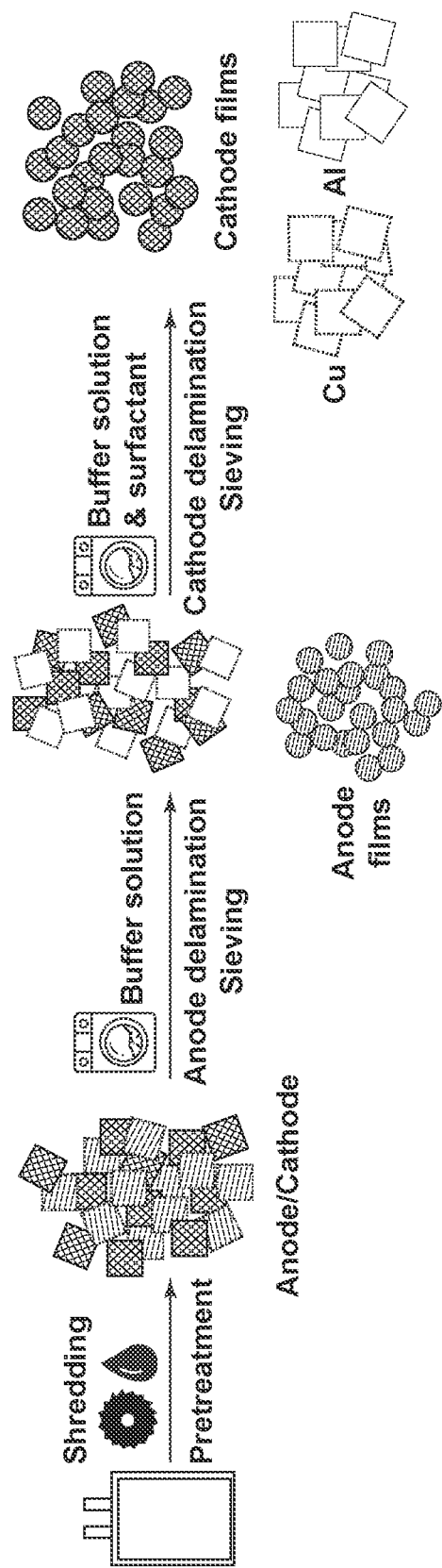
FIG. 2 is a graphical depiction of a method of recycling lithium-ion battery materials in accordance with certain embodiments of the disclosure.
Figure 3:
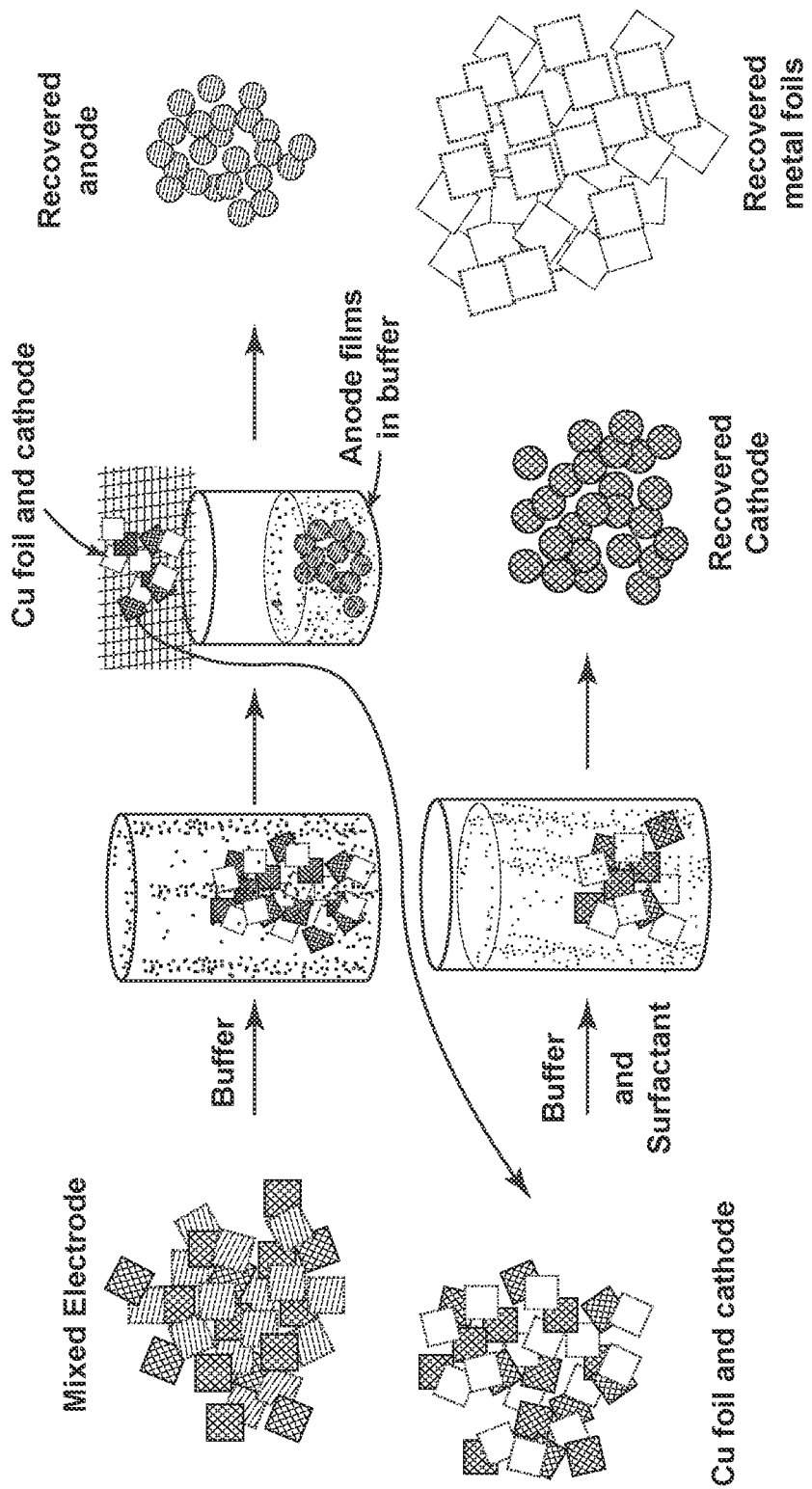
FIG. 3 is a graphical depiction of a method of recycling lithium-ion battery materials in accordance with specific embodiments of the disclosure.

A method of recycling lithium-ion batteries is provided. As described herein, the method provides a direct recycling process, and thus may be used to recover valuable components of lithium-ion batteries with intact chemical structures. The recovered components may then be reused, e.g. by preparing new components and/or new batteries therewith, thus driving down the overall production cost of preparing new batteries. As described below, the method enables an economic and more environmentally-friendly recovery of materials from spent lithium-ion batteries compared to conventional recycling methods, by using an aqueous buffer solution and surfactants, which are much safer, less costly, less toxic, and more environmentally friendly than NMP and DMF which are used in conventional separation processes. The present method effectively separates the black mass from metal foils without any deterioration on either part and with nearly 100% dissolution of the binder used in the coating of the electrode materials.

In general, the method comprises separating electrode materials from current collectors in isolated composite electrodes. As understood by those of skill in the art, a primary challenge for enabling direct recycling is separating electrode materials or black mass from the current collectors in a manner that is efficient, economical, and results in minimal or no changes to the chemical structure (e.g. morphology, composition, etc.) of both the electrode material (e.g. black mass) and the current collectors. The high stability and strong bonding capability of the organic binders utilized in typical lithium-ion batteries make it difficult to separate the electrode materials from the current collectors. As such, conventional processes for separating these components exhibit high energy consumption, low peeling-off efficiency, and produce numerous byproducts that increase environmental pollution loads. Comparatively, as described herein, the current method possesses a high peeling-off efficiency, uses cost-effective materials and techniques, and is both energy efficient and environmentally friendly.

More particularly, the method includes isolating a composite electrode including an electrode material adhered to a current collector; combining the isolated composite electrode with an aqueous buffer solution to form a mixture; delaminating the electrode material from the current collector in the mixture to give a free electrode material and a free current collector; and recovering each of the free electrode material and the free current collector from the mixture. The details of these steps of the method are described in detail below.

As will be appreciated in view of the description and examples herein, the scope of lithium-ion batteries suitable for use in the method is not especially limited, and particular such batteries will be selected by one of skill in the art in view of the particular embodiments exemplified herein, limited only by the requirements of certain components and/or composition features (e.g. such as the inclusion of a composite electrode suitable for use in the method processes described below). In general, lithium-ion batteries comprise common components, which typically include a shell or case (or "shell casing"), electrodes for storing lithium ions (e.g. a cathode electrode and an anode electrode) disposed within the shell, a separator disposed between the electrodes, and an organic electrolyte suitable for carrying the lithium ions between the electrodes through the separator. The lithium-ion batteries may be manufactured as or otherwise utilized in any particular form or type of battery, such as a coin cell (e.g. CR2032), a pouch cell, a cylindrical cell, or a combination thereof. For example, a plurality of lithium-ion batteries may be arranged in the form of a battery pack.

Regarding the battery components, the shell may include or be formed from any material known in the art for lithium-ion batteries. Typically, the shell includes a plastic material, a metal-containing material, or a combination thereof. In some embodiments, exemplary shells typically consist essentially of a single material component and are substantially homogeneous in composition. Examples of such materials include stainless steels, nickel-plated steels, and plastic-metal composites (e.g. aluminum-plastic compositions, laminates, etc.).

The separator of suitable lithium-ion batteries is not particularly limited, as will be understood in view of the description below. As such, any separator suitable for use in a lithium-ion battery can theoretically be utilized, with particular separators being selectable for use in view of the other battery components by one of skill in the art (e.g. to provide a low resistance against ion migration of the electrolyte, excellent electrolyte solution-wetting ability, etc.). General examples of such materials are selected from glass fiber, polyester, Teflon, polyolefins (e.g. polyethylene (PE), polypropylene (PP), polytetrafluoroethylene (PTFE), etc.), and various combinations thereof, and may be utilized in a form of a nonwoven or woven fabric. Specific examples of separators typically include porous membranes comprising PE, PP, or PE/PP copolymers, which are generally unreactive with organic solvents and thus suitable for safe use with the other battery components.

The electrolyte is also not particularly limited in terms of the method, and thus suitable lithium-ion batteries may generally include any electrolyte solution or composition suitable for use in a lithium-ion battery. General examples of such electrolyte compositions generally include various liquid electrolytes and solid electrolytes. Example of liquid electrolytes typically include electrolyte salts (e.g. lithium salts, such as $LiPF_6$, $LiBF_4$, $LiCF_3SO_3$, $Li(SO_2CF_3)_2$, $LiClO_4$, etc.) in an organic solvent (e.g. alkyl carbonates, such as ethylene carbonate, dimethyl carbonate, diethyl carbonate, etc.).

The electrodes of lithium-ion batteries suitable for the method typically include an electrode material adhered to a current collector with an organic binder. The particular electrode material and current collector will be selected based on the use of the particular electrode. i.e., as a cathode electrode ("cathode") or an anode electrode ("anode") in the battery utilized.

In some embodiments, the composite electrode is further defined as a composite cathode. In such embodiments, the electrode material is further defined as a cathode active material. It will be appreciated that, as a component of the lithium-ion battery being recycled, the cathode active material typically comprises a lithium-bearing metal oxide. Examples of such compounds include $LiCoO_2$, $LiMn_2O_4$, $LiNiO_2$, $LiCrO_2$, $LiFePO_4$, $LiNiO_2$, $Li\ Mn_2O_4$, $LiV_2O_5$, $LiTiS_2$, $LiMoS_2$, $LiMnO_2$, as well as variations of lithium nickel oxides, lithium nickel manganese oxides, lithium nickel manganese cobalt oxides, and the like, exemplified by those having general formulas such as $LiNi_xMn_yO_2$, $Li_{1+z}Ni_xMn_yCo_{1-x-y}O_2$, $LiNi_xCo_yAl_zO_2$, $LiNi_xCo_yMn_zO_2$, etc., where each x, y, and z is typically a mole fraction of from 0 to 1, where x+y+z=1. Such materials are known in the art, and will be readily selected by those of skill in the art. The cathode active material may also comprise a conductive agent, e.g. for enhancing the electron conductivity of the cathode active material.

In general, the composite electrode includes a binder, such as an organic binder, to adhere together the active components thereof (e.g. the conductive materials, conductive agents, etc.), as well as to adhere the electrode material to the adjacent current collector. In the present embodiments, the organic binder is typically a polyvinylidene fluoride (PVDF)-based binder ("PVDF binder"), as will be best understood in view of the entire description and the examples herein. Examples of such PVDF binders generally include, either as a homopolymeric composition, as a copolymer or interpolymer of PVDF and one or more other monomers, or a multi-polymer composition comprising a PVDF homo- or copolymer with one or more other polymers. Such PVDF binders are known in the art, and will be readily selected by those of skill in the art in consideration of preparing the electrode materials and composite electrodes described herein. Examples of particular PVDF binders may include various combinations of polyvinylidene fluorides, polytetrafluoroethylenes, fluorinated ethylene-propylene copolymers (e.g. from tetrafluoroethylene and/or hexafluoropropylene, etc.), and various per- or polyfluoroalkoxy polymers. One of skill in the art will appreciate that, while PVDF is exemplified herein, other similar binders to those above, even some that are substantially free from, alternatively are free from PVDF, may also work as intended when utilized in the method. For example, the binder may be a styrene-butadiene rubber (SBR) binder, a carboxymethyl cellulose (CMC) binder, a poly(acrylic acid) (PAA) binder, or other suitable binder.

The current collectors of suitable lithium-ion batteries are not particularly limited, as will be understood in view of the description below. In general, any current collector suitable for use in a lithium-ion battery can theoretically be utilized, with a particular current collector being selectable for use in view of the other battery components (i.e., the other electrode components, such as the binder and active materials thereof) by one of skill in the art. Examples of suitable current collectors generally include materials including aluminum, copper, nickel, titanium, stainless steel, and even some carbonaceous materials. The current collector may be in any form known in the art, such as plates, sheets, foils, etc. Such terms may be overlapping in scope, as the current collector may have any thickness that is suitable for carrying a current, but will typically be selected with a minimal thickness in order to maximize energy density. Other materials and structures, as well as specific treatments (e.g. etching, coating, etc.) may be utilized to enhance the electrochemical stability and electrical conductivity of current collectors; however, it will be appreciated that not all composite current collectors may be suitable for use in the method in all circumstances, as the conditions and materials may be optimized for homogeneous metallic current collectors. In certain embodiments, the lithium-ion battery includes a cathode having an aluminum current collector. In specific embodiments, the cathode current collector is an aluminum sheet or foil.

As introduced above, the method includes isolating the composite electrode from a spent lithium-ion battery. Typically, the method includes discharging the lithium-ion battery before further processing, i.e., to remove any remaining charge stored therein. In this fashion, the term "spent" is used herein to refer to a discharged battery, and is not necessarily limited to an end-of-life or fully discharged battery.

Techniques for discharging are not limited, and are exemplified by soaking the battery in an aqueous solution (e.g. neutral or alkaline) containing a conducting salt (e.g. $NaHCO_3$, $KHCO_3$, $Na_2CO_3$, $K_2CO_3$, $CaCO_3$, $MgCO_3$, NaOH, KOH, $Ca(OH)_2$, $Mg(OH)_2$, NaCl, $CaCl_2$, and the like, or combinations thereof). In some embodiments, the shell of the battery may be punctured (e.g. via piercing, cutting, etc.) before soaking in the aqueous solution for discharge.

Once the battery is discharged, isolating the composite electrode generally includes dismantling the battery and separating the composite electrode from the other battery components, such as the shell, electrolyte, separator, etc. The isolation process is not limited, and may be carried out in various fashions with any technique meeting the limitations of the embodiments described herein. For example, isolation techniques will typically be selected in view of the aim of the direct recycling, that is to not damage, destroy, or otherwise render the composite electrode less usable than in the native state prior to isolation. More particularly, the step of isolating the composite electrode includes rinsing the cathodes, anodes, and separators of discharged lithium-ion batteries with an organic solvent such as dimethyl carbonate that is unreactive with the battery components and also capable of removing any residual amount of electrolyte or particular matter from the components. Subsequently, the composite electrodes (cathodes and/or anodes) are dried and chopped, cut, or shredded into smaller pieces (e.g. via manually or computer-monitored saw/blade cutting, shredder, etc.). The pieces may be sized for homogeneity, increased surface area, processing capabilities of the particular equipment utilized, etc. In addition, cathode scraps which are produced from battery manufacturing may be shredded and included in the recycling feedstock.

As introduced above, the method includes combining the isolated composite electrode with an aqueous buffer solution to form a mixture. More particularly, the isolated composite electrode may include both composite anode and composite cathode materials which are together added to the aqueous buffer solution to form a first mixture. In order to avoid aluminum corrosion due to the increase in pH from lithium leaching, the buffer solution includes one or more buffer salts to keep the pH of the solution in the passivation range. For example, the aqueous buffer solution may have a pH generally ranging from 4 to 7. Further, the aqueous buffer solution may be one of a phosphate buffer solution, an acetate buffer solution, a citrate buffer solution, or other similar aqueous buffer solution that can maintain a pH in the range of 4 to 7. One suitable buffer solution is an aqueous solution of potassium dihydrogenphosphate (KDP). After combining the composite electrodes with the aqueous buffer solution to form the first mixture, the mixture is agitated (e.g., stirred) at room temperature (i.e. a temperature of approximately 20° C. and/or generally in the range of 19-24° C.) for a time period of between 1 and 30 minutes, preferably 10 to 30 minutes to delaminate the anode active material from the anode current collector, thus forming a second mixture including free anode active material, free anode current collector, and the composite cathode. The aqueous buffer solution alone (without surfactants) separates/delaminates the anode active material from the anode current collector, but does not appreciably separate the cathode active material from the current collector of the composite cathode. Hence, the composite cathode generally remains in tack in the first solution, and the anode active material can be recovered prior to cathode delamination. The free anode active material is then removed from the second mixture by reducing the size of the anode active material through stirring and/or Vortex shaking, sieving/screen filtering the mixture to separate the free anode current collector and composite cathode from the free anode active material in the buffer solution, rinsing the free anode current collector and composite cathode to remove any residual free anode active material, subsequently filtering the remaining solution to remove the free anode active material from the solution, and washing and drying the obtained free anode active material.

Subsequent to obtaining the free anode active material from the second mixture, the free anode current collector and the composite cathode separated from the second mixture are combined with the aqueous buffer solution to form a third mixture. In order to delaminate the cathode active material from the cathode current collector, a surfactant is added to the third mixture to form a fourth mixture including free anode current collector, composite cathode, and one or more surfactants in the aqueous buffer solution. Suitable surfactants include but are not limited to sodium dodecyl sulfate (SDS), sodium lauryl sulfate (SLS), poly(acrylic acid) (PAA), poly(ethylene glycol) (PEG), and polyethylene glycol tert-octylphenyl ether (e.g. Triton™ X-100). The surfactant aides in wetting the interface between the cathode current collector (e.g., aluminum) and the cathode active material, and functionalizes the aluminum surface (which is aluminum oxide), replacing the bonding between the binder (typically PVDF) and aluminum. The fourth mixture including the surfactant and composite cathode is stirred, and the delamination may be conducted at room temperature or the fourth mixture may be heated to a temperature in the range of 20 to 100° C. The higher the temperature, the generally shorter the required separation time, which may be in the range of 1 to 30 minutes, preferably 10 to 30 minutes. Once delamination of the composite cathode is complete, a fifth mixture is thus formed, the fifth mixture including free cathode active material, free cathode current collector, free anode current collector, and surfactant in the aqueous buffer solution. The free cathode active material, free cathode current collector, and free anode current collector are removed from the fifth mixture by filtering the mixture. The free cathode active material, free cathode current collector, and free anode current collector are then washed and dried. Next, the washed and dried free cathode active material, free cathode current collector, and free anode current collector are milled (e.g., SPEX milling for a time period of approximately 15 seconds) and subsequently subjected to sieving to obtain the final recycled materials.

In the manner described above, the method provides for the sequential delamination of the composite anode and the composite cathode in that order in two main steps (anode separation followed by cathode separation). It should be understood, however, that either of these two steps may be conducted in isolation. In other words, solely composite anode or solely composite cathode may be delaminated in the ways described above.

The free current collector recovered by the disclosed process may be substantially free from corrosion, and substantially free from residual electrode material. As introduced above, the method may be utilized in direct recycling, such that the components recovered from the battery may be reused. For example, in some embodiments, the free electrode material recovered from the mixture comprises substantially the same morphology as the initial electrode material. In these or other embodiments, the free electrode material recovered from the mixture has substantially the same chemical composition as the initial electrode material. In these or other embodiments, the free electrode material recovered from the mixture has substantially the same electrochemical performance as the initial electrode material. In some embodiments, the free electrode material recovered from the mixture is directly reusable in the preparation of a new composite electrode. However, it will be appreciated that the free electrode material may also be processed in numerous ways prior to such use or any final application.

In some embodiments, the method further includes preparing a new composite electrode using the free electrode material. In some such embodiments, the method further includes preparing a new lithium-ion battery using the new composite electrode. In this fashion, the composite electrode may be reused, and thus that component of the battery recycled, once recovered. Similarly, in certain embodiments, the free current collector is reused to prepare a new composite electrode and/or a new battery.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of recycling lithium-ion battery materials, the method comprising:
   isolating a composite electrode, the composite electrode comprising an electrode material adhered to a current collector, wherein the composite electrode is further defined as both a composite anode and a composite cathode, the composite anode comprising an anode active material adhered to an anode current collector, and the composite cathode comprising a cathode active material adhered to a cathode current collector;
   combining the composite electrode with an aqueous buffer solution, the step of combining including mixing the composite anode and the composite cathode in the aqueous buffer solution to form a first mixture;
   delaminating the electrode material from the current collector to give a free electrode material and a free current collector, the step of delaminating including separating the anode active material from the anode current collector to form a second mixture comprising free anode active material, free anode current collector, and the composite cathode; and
   recovering each of the free electrode material and the free current collector, the step of recovering including removing the free anode active material from the second mixture;
   subsequent to removing the free anode active material from the second mixture, the step of combining further includes mixing the free anode current collector and the composite cathode in the aqueous buffer solution to form a third mixture;
   the step of delaminating further includes adding a surfactant to the third mixture to form a fourth mixture;
   the step of delaminating further includes separating the cathode active material from the cathode current collector in the fourth mixture to form a fifth mixture comprising free cathode active material, free cathode current collector, and the free anode current collector; and
   the step of recovering further includes removing the free cathode active material, the free cathode current collector, and the free anode current collector from the fifth mixture;

whereby the composite anode and the composite cathode are delaminated sequentially in that order.

2. The method of claim 1, wherein the step of delaminating is conducted at room temperature.

3. The method of claim 1, wherein the aqueous buffer solution maintains a pH of between 4 and 7, and the aqueous buffer solution is one of a phosphate buffer solution, an acetate buffer solution, and a citrate buffer solution.

4. The method of claim 1, wherein the surfactant is one or more selected from the group consisting of sodium dodecyl sulfate (SDS), sodium lauryl sulfate (SLS), poly(acrylic acid) (PAA), poly(ethylene glycol) (PEG), and polyethylene glycol tert-octylphenyl ether.

5. The method of claim 1, wherein the step of delaminating is conducted at a temperature of between 20 and 100° C.

6. The method of claim 1, wherein the step of delaminating includes stirring the second and/or fourth mixture.

7. The method of claim 1, wherein the step of delaminating is complete in under 30 minutes.

8. The method of claim 1, wherein recovering each of the free electrode material and the free current collector from the second and/or fifth mixture comprises one or more of: (i) sieving the second and/or fifth mixture; (ii) subjecting the second and/or fifth mixture to filtration; (iii) milling the free electrode material and the free current collector; (iv) rinsing at least one of the free electrode material and the free current collector; and (v) drying at least one of the free electrode material and the free current collector.

9. The method of claim 1, wherein:
the step of removing the free anode active material from the second mixture includes reducing the size of anode active material through stirring or Vortex shaking, filtering the second mixture, and washing and drying the free anode active material;
the step of removing the free cathode active material, the free cathode current collector, and the free anode current collector from the fifth mixture includes:
filtering the fifth mixture;
washing and drying the free cathode active material, the free cathode current collector, and the free anode current collector; and
milling and sieving the free cathode active material, the free cathode current collector, and the free anode current collector.

10. The method of claim 9, wherein:
the step of filtering the second mixture includes screen filtering the second mixture to separate the free anode current collector and composite cathode from the second mixture, rinsing the free anode current collector and composite cathode to remove any residual free anode active material, and subsequently filtering a remaining mixture of free anode active material in the aqueous buffer solution and to obtain the free anode active material.

11. The method of claim 1, wherein the step of isolating the composite electrode comprises: (i) separating the composite electrode from one or more other components of the lithium-ion battery; (ii) washing the composite electrode to remove a residual electrolyte therefrom; or (iii) both (i) and (ii).

12. The method of claim 1, further comprising the step of shredding the isolated composite electrode into a collection of smaller fragments before the step of combining the composite electrode with the aqueous buffer solution to form the first and/or third mixture.

13. The method of claim 1,
wherein: (i) the anode active material comprises an electroconductive carbon compound; (ii) the current collector comprises copper; or (iii) both (i) and (ii).

14. The method of claim 1,
wherein: (i) the cathode active material comprises a lithium-bearing metal oxide; (ii) the current collector comprises aluminum; or (iii) both (i) and (ii).

15. The method of claim 1, wherein the composite electrode is one or both of a spent electrode from a spent lithium-ion battery and electrode scrap from an electrode manufacturing process.

16. The method of claim 1, wherein the electrode material is adhered to the current collector with one of a polyvinylidene difluoride (PVDF) binder, a styrene-butadiene rubber (SBR) binder, a carboxymethyl cellulose (CMC) binder, or a poly(acrylic acid) (PAA) binder.

17. The method of claim 1, wherein the free electrode material recovered from the second and/or fifth mixture: (i) comprises substantially the same morphology as the electrode material; (ii) comprises substantially the same chemical composition as the electrode material; (iii) comprises substantially the same electrochemical performance as the electrode material; or (iv) any combination of (i)-(iii).

18. The method of claim 1, wherein the free current collector recovered from the second and/or fifth mixture is substantially free from: (i) corrosion; (ii) residual electrode material; or (iii) both (i) and (ii).

* * * * *